United States Patent [19]

Slafer

[11] Patent Number: 4,575,406

[45] Date of Patent: Mar. 11, 1986

[54] MICROPOROUS FILTER

[75] Inventor: Warren D. Slafer, Arlington, Mass.

[73] Assignee: Polaroid Corporation, Cambridge, Mass.

[21] Appl. No.: 633,290

[22] Filed: Jul. 23, 1984

[51] Int. Cl.[4] .......................... C25D 1/08; C25D 1/20; C25D 5/02
[52] U.S. Cl. .......................................... 204/11; 204/15
[58] Field of Search ..................................... 204/15, 11

[56] References Cited

U.S. PATENT DOCUMENTS

| | | | |
|---|---|---|---|
| 2,225,734 | 12/1940 | Beebe | 204/11 |
| 2,226,381 | 12/1940 | Norris | 204/11 |
| 2,230,868 | 2/1941 | Kuhlman | 204/11 |
| 3,291,871 | 12/1966 | Francis | 204/15 |
| 3,695,927 | 10/1972 | Futterer | 204/11 |

Primary Examiner—T. M. Tufariello

[57] ABSTRACT

A surface-type metal microporous filter is provided having a substantially uniform pore size of less than 15 micrometers and an open area greater than 10%. Methods for preparing such a filter by electrodeposition techniques are also disclosed.

12 Claims, No Drawings

MICROPOROUS FILTER

BACKGROUND OF THE INVENTION

Microporous filter media are employed for removing ultra-fine microscopic particles from the medium in which they are suspended. As examples of particulate media which may be separated by such filters from the fluid environment in which they are disposed, mention may be made of bacteria, colloidal substances and the like.

Surface-type filters capable of effectively filtering materials of a relatively small size suffer from a deficiency of lack of uniformity of pore size, non-uniformity of spatial distribution of pores, fragility as the pores become more uniformly distributed and a relatively low percentage of open area. The term "open area" as used herein is intended to refer to the voids or pores or openings in the filter unit as a percentage of the total surface area of the filter. It will be readily seen that the efficiency of a filter would increase with an increase in open area.

The term "surface-type filters", as used herein is intended to refer to thin films having pores which extend from one surface to the other surface and function by trapping material on the upstream side of the filter. This is in contradistinction to depth-type filters which are relatively thick, possess pores of significant length, and function by trapping materials within the filter element.

In selecting a material for construction of a filter, consideration must be given to the environment in which it is to function. Thus, the material must not be significantly effected by the corrosive, solvating action or other conditions of the environment which would subject the filter to severe damage or destruction. Metal filters are particularly useful because of their strength and the varieties of metals available to permit a wide selection of filter material depending upon the environment in which they are to be employed. Generally, metal filters are formed from sintered particles in the order of 2–50 microns in diameter. Such a sintering operation requires controlled melting to fuse the particulate mass sufficiently to bind the particles together but not to the extent that a passage through them is totally restricted. It will be seen that unless this method is carefully controlled, the resulting filter may have a relatively low through-put or possess a non-uniform pore size.

A novel metal filter and methods for obtaining such a filter has now been found which are not susceptible to the deficiencies of the prior art.

SUMMARY OF THE INVENTION

The present invention is directed to a surface-type metal filter having substantially uniform pore size of less than 15 micrometers and an open area greater than 10%. Methods for preparing the metal filters of the present invention by electrodeposition techniques are disclosed.

DETAILED DESCRIPTION OF THE INVENTION

The term "metal" as used herein is intended to refer to materials of a single metallic element or series of elements which can be electrodeposited, such as nickel, copper, cobalt, silver, gold, chromium, platinum, palladium or rhodium.

The present invention is directed to a surface-type metal filter which contains substantially uniform size pores, an open area greater than 10% and a uniform distribution of the pores. By means of the present invention, metal filters may be formed which possess substantially any desired size pores in any desired pattern distribution and pore shape, including rectilinear as well as circular pores. Thus, in the present invention, the size, configuration, and distribution of the pores are uniform and preselected, providing more predictability, uniformity and efficiency compared to prior art methods of forming metal filters. Preferably, the filter consists of close-packed pores with an open area of about 50%, and more preferably about 75%. The pore size preferably ranges from about 15 to 0.1 micrometers.

The novel method of the present invention comprises the electrodeposition of a metal onto a substantially planar electrically conductive substrate containing a geometric pattern of substantially non-conductive areas corresponding to the shape, size and distribution of the desired pores. Thus, the metal during the electrodeposition stage is selectively deposited upon the electrically conductive areas with substantially no deposition occurring in the non-conductive areas. The electrodeposited metal layer is then separated from the carrier base with the areas corresponding to the non-conductive portions forming the pores in the metal filter. If desired, additional dimensional stability may be provided by adhering the thus-formed microporous metal filter to a porous substrate with significantly larger porosity.

In a preferred embodiment, the novel filter of the present invention is formed by employing a substantially planar surface having a relief pattern of depressions wherein said depressions correspond substantially to the size and shape of the pores desired in the finished filter. The structure is then made selectively conductive and non-conductive by evaporating metal onto the surface at an angle of incidence such that the flat or land areas are substantially covered with a continuous layer of metal while the depressions receive little or no metal. The thus-formed substrate is then immersed in an electrodeposition tank wherein metal is selectively deposited onto the conductive surfaces, that is, the areas containing the evaporated metal layer, while no metal deposition will occur in the areas which do not have evaporated metal thereon, i.e., the depressions. Electrodeposition is carried out for a time sufficient to provide the desired thickness of metal. The thus-formed metal filter may then be separated from the substrate form upon which it is formed by peeling away the metal filter or by dissolution of the form in a suitable solvent.

In an alternative embodiment, a relief pattern as described above is employed wherein the entire surface is rendered substantially uniformly conductive. The depressions are then filled with an insulating material, for example, lacquer, gelatin, etc. by means of a doctor blade and the substrate is then immersed in an electrodeposition tank. Metal will plate out on the electrically conductive surfaces but not on the non-conductive material which has been deposited in the depressions. This method is particularly useful when the conductive relief pattern employed as a substrate is a solid metal. This permits easy reuse of the substrate to form a plurality of filters. In the case of the substrate as solid metal, a parting layer or stripping layer is preferred in order to readily separate the electrodeposited filter layer formed on the conductive layer from the substrate.

The novel process of the present invention lends itself to either the batch or continuous operation. For example, a web of a metalized relief pattern form can be run through an electrodeposition bath with a residence time sufficient to provide the desired metal deposition. Alternatively, the substrate can be in the form of an endless belt wherein the metal filter element can be withdrawn as it exits from the electrodeposition tank and the belt recycled to produce more filter.

In still another embodiment, the vacuum deposited layer formed by evaporating metal onto a surface relief pattern at an angle of incidence such that substantially no deposition occurs in the depressions may be removed from the relief pattern at that point and layered onto a planar non-conductive substrate, for example, by lamination. Electrodeposition of this element will result in metallic build-up on the evaporated metal framework without any metal adhering to the non-conductive substrate in the area of the filter pores.

The electrodeposition techniques employed in the present invention are conventional in the art. For more details reference may be made to *Nickel Plating*, by Robert Brugger, Robert Draper, Ltd., Teddington, England, 1970 and *Principles of Electroplating and Electroforming*, 3rd Ed., Bloom and Hogaboom, McGraw-Hill, Inc., New York, N.Y. 1949.

The surface relief pattern employed in the method of the present invention may be formed in a variety of ways. The preferred method comprises interference pattern exposure of a layer of photoresist by a laser and development of the photoresist to provide a close packed array of holes as a relief pattern in the photoresist. The photoresist may be used at this point as the substrate upon which the conductive layer is applied by evaporation techniques. Alternatively, electroforming techniques may be used to form a negative replica of the relief pattern which may be employed to form an embossing tool. This embossing tool may then be employed to form replicas of the original relief pattern. The thus-described intereference pattern exposure techniques are particularly advantageous because extremely small depressions can be formed with substantially any spacing and geometric arrangement and shape.

In one method of forming relief pattern, a positive photoresist is coated on a support and provided a patterned exposure to interfering laser beams of suitable wavelength. This becomes a relief pattern upon the development of the photoresist with a suitable developer. As stated above, the relief pattern may be used at this point or it may be used to form an embossing tool to emboss a suitable deformable polymer layer, for example, to provide the surface relief substrate employed in forming the filter of the present invention.

To form a master embossing tool, silver is deposited by vacuum deposition on the relief image in the photoresist in an amount sufficient to render the surface of the relief image electrically conductive. A nickel sulfamate-nickel chloride electroform solution is then employed to plate nickel over the silver relief pattern. The thus-formed nickel form which now constitutes a negative image of the relief pattern is removed and employed as an embossing tool. In a particularly preferred embodiment, the nickel electroform is formed in a drum configuration for ease and rapidity of embossing. As stated above, by selecting the exposure system and development conditions, the size, spacing and distribution of the relief pattern can be selected which in turn determines the dimensions and spacing of the elements in the embossing tool and ultimately the pores of the filter. This master embossing tool can be used to replicate the relief pattern in, e.g., a cellullose acetate butyrate polymer on a polyester support. Silver can then be evaporated in this pattern at a grazing angle and then a layer of nickel deposited therein by electrodeposition.

As examples of methods for producing the surface relief pattern which can be electroformed to form the embossing tool, reference may be made to U.S. Pat. No. 4,402,571 issued Sept. 6, 1983 to James J. Cowan, et al. and copending application Ser. No. 454,728 filed Dec. 30, 1982 (common assignee), both of which are incorporated by reference herein in their entirety.

What is claimed is:

1. A method for forming a metal filter having a pore size of less than 15 micrometers and an open area of greater than 10% which comprises the step of providing a patterned exposure of a photoresist with interferring laser beams; developing said exposed photoresist to provide a substantially planar surface having a relief pattern of depressions therein in said photoresist; rendering said surface electrically conductive, electrically depositing a metal on said electrically conductive surface; and removing the thus-formed metal layer.

2. The method of claim 1 wherein said electrically conductive substrate comprises a thin metal layer carried on a non-conductive substrate.

3. The method of claim 2 wherein said surface is rendered electrically conductive by evaporating an electrically conductive layer thereon.

4. The method of claim 3 wherein said evaporation is carried out at an angle of incidence such that substantially no metal is deposited in said depressions.

5. The method of claim 1 wherein said depressions are filled with a non-electrically conductive material prior to said electrodeposition.

6. The method of claim 1 which includes laminating said electroformed metal filters to a porous support.

7. A surface-type metal filter of substantially uniform pore size of less than about 15 micrometers having an open area greater than 10%.

8. The product of claim 7 wherein said pore size ranges from about 15 to about 0.3 micrometers.

9. The product of claim 7 wherein said open area is about 50%.

10. The product of claim 7 which includes a porous support.

11. The product of claim 7 which includes a uniform distribution of pores.

12. The product of claim 7 wherein said metal is nickel.

* * * * *